(12) United States Patent
Hurst et al.

(10) Patent No.: US 7,748,107 B2
(45) Date of Patent: Jul. 6, 2010

(54) BAR MOUNTED TOOL ADAPTOR

(75) Inventors: Rick Hurst, Rochester Hills, MI (US); Corey Chappus, Armada, MI (US); Bryan Voss, Warren, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 1250 days.

(21) Appl. No.: 11/248,074

(22) Filed: Oct. 12, 2005

(65) Prior Publication Data

US 2006/0078413 A1 Apr. 13, 2006

Related U.S. Application Data

(60) Provisional application No. 60/617,969, filed on Oct. 12, 2004.

(51) Int. Cl.
*B23P 21/00* (2006.01)
*B65G 1/133* (2006.01)

(52) U.S. Cl. .................... 29/721; 414/752.1

(58) Field of Classification Search .............. 29/469, 29/559, 721, 700, 281.1, 281.4, 281.5, 281.6, 29/283, 743; 414/752.1, 749, 749.1, 751.1; 294/65; 901/16
See application file for complete search history.

(56) References Cited

U.S. PATENT DOCUMENTS

| | | | |
|---|---|---|---|
| 5,733,097 | A | 3/1998 | Herbermann et al. |
| 5,746,567 | A | 5/1998 | Herbermann et al. |
| 5,909,998 | A | 6/1999 | Herbermann et al. |
| 6,190,395 | B1 * | 2/2001 | Williams .................... 606/130 |
| 6,244,814 | B1 | 6/2001 | Herbermann et al. |

* cited by examiner

*Primary Examiner*—John C Hong
(74) *Attorney, Agent, or Firm*—Young Basile Hanlon & MacFarlane, P.C.

(57) ABSTRACT

A tool mount assembly includes drop down connections to aid in mounting of a tool to a moving base and a fail-safe tool mounting system for preventing installation of a tool in an undesired or incorrect manner. A plurality of tool mount rails are received within mounts and are uniquely tailored to assure proper placement of tools such as grippers or vacuum cups at desired locations specific to the application requirements.

10 Claims, 3 Drawing Sheets

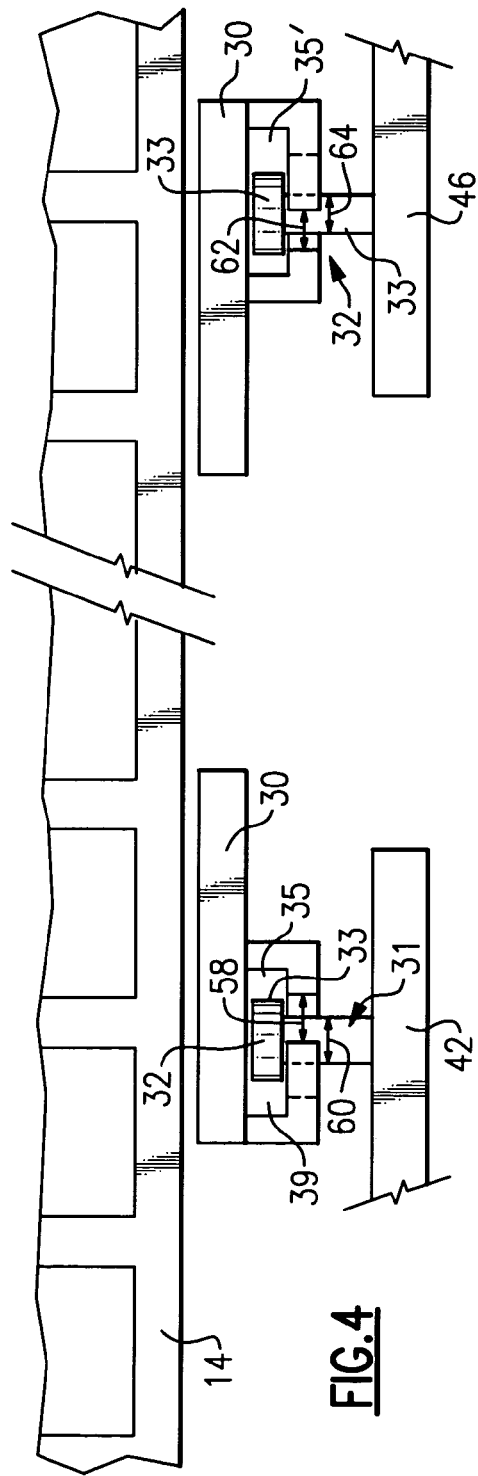
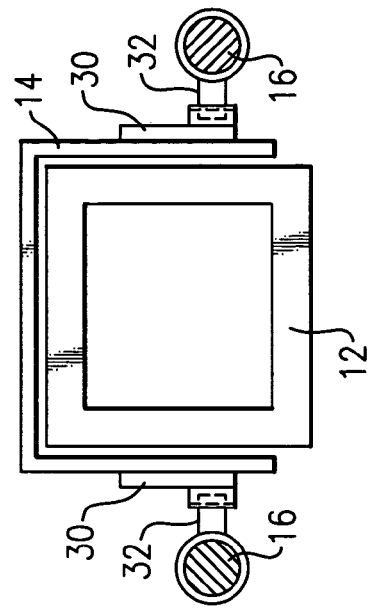
FIG.5
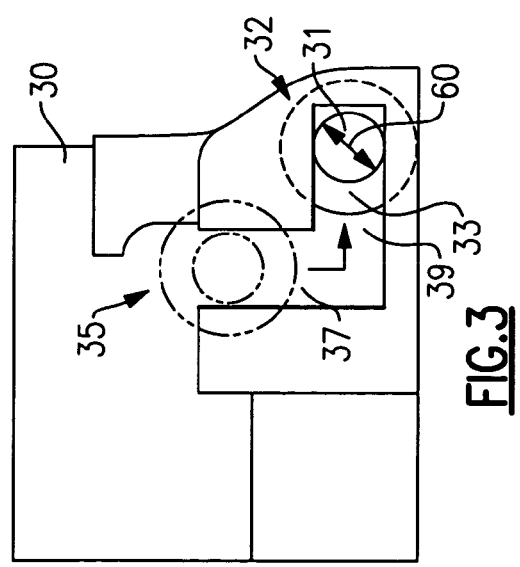
FIG.3
FIG.4

BAR MOUNTED TOOL ADAPTOR

REFERENCE TO RELATED APPLICATION

The application claims priority to U.S. Provisional Application No. 60/617,969 that was filed on Oct. 12, 2004.

BACKGROUND OF THE INVENTION

This invention generally relates to a tool mounting system for a workpiece transfer system. More particularly, this invention relates to a tool mounting system mountable to a workpiece transfer system.

A workpiece transfer system includes a bar that moves a workpiece between desired locations. Often the workpiece transfer system will move body panels between stamping stations. Tools such as grippers or vacuum cups are attached to the bar and grasp a workpiece at one location and release the workpiece at another location. The tools often utilize pressurized air for actuation and therefore need numerous pneumatic couplings and conduits that are attached to the bar.

In many applications of workpiece transfer systems, the clearance between the bar and the stamping station is limited. Accordingly, each part must fit within certain defined space restrictions. This includes the pneumatic and electrical wires that supply and control actuation of the gripper and vacuum tools.

Further, it is often the case with many transfer systems that multiple workpiece configurations are fabricated within the same line. The stamping dies are changed over along with the tooling required to move the workpieces between stations. Rigidly attached tooling makes change over difficult and time consuming.

Accordingly, it is desirable to design a transfer system that provides for switching of tooling while remaining within the space limitations of the transfer system.

SUMMARY OF THE INVENTION

An example tool mount assembly according to this invention includes drop down connections to aid in mounting of a tool to an adaptor plate and a fail-safe tool mounting system for preventing installation of a tool in an undesired or incorrect manner.

The example tool mount assembly includes an adaptor that is mounted to a bar of a part transfer machine. A plurality of tool mount arms are received within the adaptor and are specifically tailored to provide proper placement of tools such as grippers or vacuum cups relative to a specific panel or part configuration. The adaptor includes several mounting locations to receive a plurality of arms.

Each mounting location of each arm includes a fail-safe mounting allowing only the specified tooling to be installed. In this manner, it is not possible to properly install a tool in an incorrect location. The fail-safe mounting is provided by a specified desired distance between a base quick lock connection and a second connection. Each of the second connections includes a lug that is dropped down into a lug mount. The drop down feature provided by the lug and lug mount ease mounting of the tool to speed tool change over.

These and other features of the present invention can be best understood from the following specification and drawings, the following of which is a brief description.

BRIEF DESCRIPTION OF THE DRAWINGS

FIG. 3 is a schematic view of an example lug mount according to this invention.

FIG. 4 is a top schematic view of example drop down lug mounts according to this invention.

FIG. 5 is a cross-sectional view of the example tool mounting system.

DETAILED DESCRIPTION OF THE PREFERRED EMBODIMENT

Figure 1:
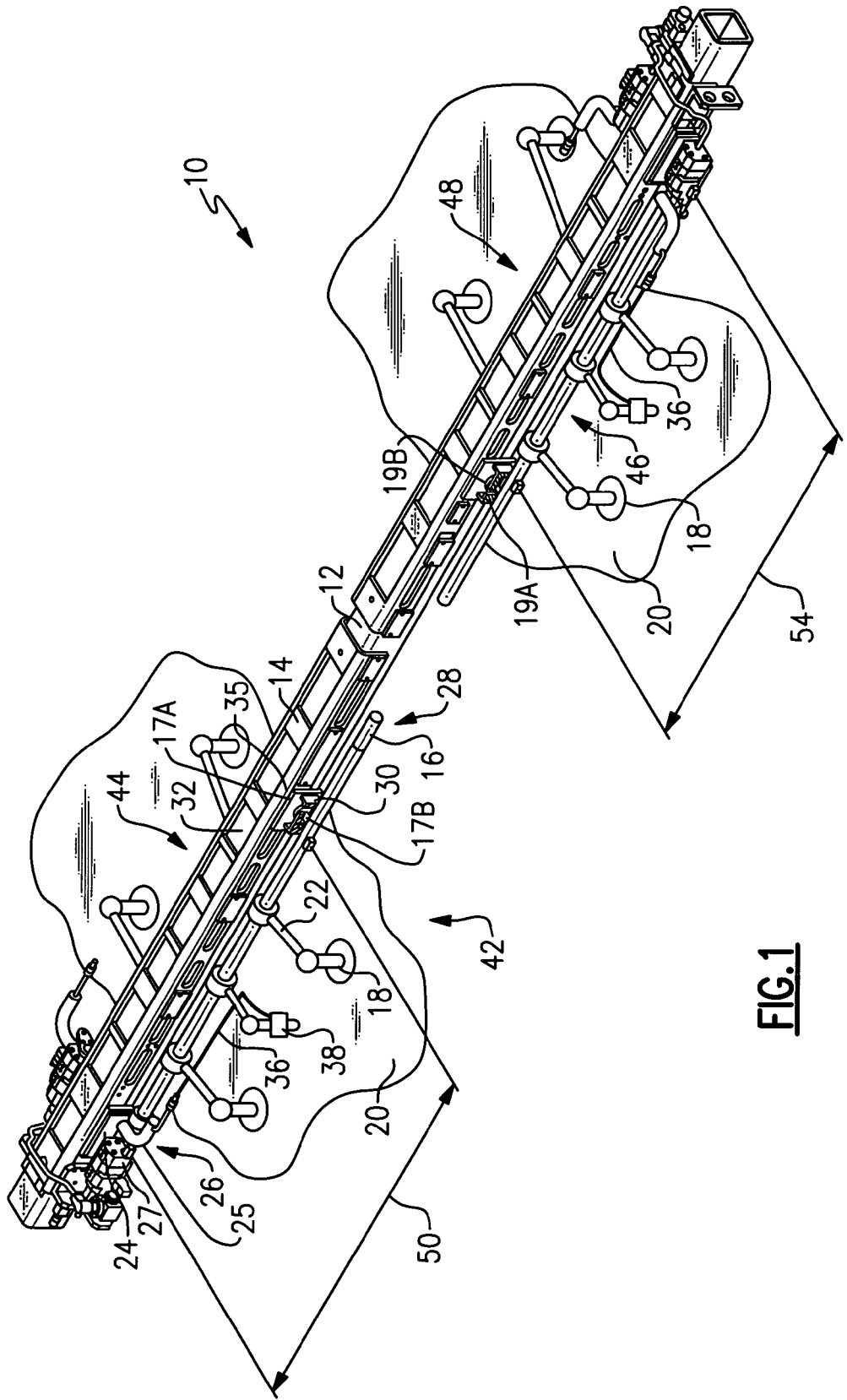
FIG. 1 is a perspective view of an example bar tool mounting system according to this invention.

Referring to FIG. 1, the workpiece transfer system 10 includes a bar 12 that moves a workpiece 20 between workstations (not shown). An adaptor 14 is attached to the bar 12 and supports the tools 18. The tools 18 extend from removable rails 16 attached to the adaptor 14. The tools 18 illustrated are pneumatically actuated suction cups. However, other tools as are known would also benefit from the disclosures of this invention, for example mechanical grippers and part present sensing devices.

The rail 16 is part of a rail assembly. There are four rail assemblies 42, 44, 46 and 48 illustrated. The tools 18 are mounted to arms 22 that are in turn mounted to the rail 16 of each rail assembly 42, 44, 46 and 48. The position of the tools 18 along the rail 16 is infinitely adjustable such that the configuration and placement of the tools 18 can be tailored to the requirements of a specific application and workpiece 20.

Each of the rail assemblies 42, 44, 46 and 48 include a mount plug 25 that is attachable to selectively releasable mount connector 24 attached to the adaptor 14. The mount plug 25 is affixed to a first end of the rail 16 for each of the rail assemblies 42, 44, 46 and 48. The mount plug 25 interfaces with the mount connector 24 to communicate pressurized air and provide an electrical connection for any electrical devices mounted to the rail 16. The mount connector 24 includes a locking device 27 movable between a released position where the rail 16 may be removed and a secured position where the rail 16 is rigidly held into the mount connector 24, and the desired electrical and pneumatic connections are completed.

The example rail assembly 42 includes a sensor 38 for detecting the presence of the workpiece 20. The sensor 38 is electrically attached through the interface between the mount plug 25 and the mount connector 24. The mount connector 24 is in turn in communication with a source of electrical energy and pressurized air. Further, the mount connector 24 is adaptable for providing communication of control signals to the tools 18 mounted to the rail 16.

The mount connector 24 also provides support of an end of the rail 16. The second end 28 of the rail 16 is supported by a lug 32 that fits within a lug mount 30. The lug 32 on the rail 16 is first placed within the lug mount 30 and slid axially into full engagement with the mount connector 24. The lug mount 30 receives the lug 32 within a slot 35 that includes a vertical portion 37 and horizontal portion 39. The lug 32 drops within the vertical portion 37 of the slot 35 and is slid axially within the horizontal portion 39 of the slot to facilitate axial engagement and securement of the mount plug 25 within the mount connector 24. Although a mount connector 24 and mount plug 25 are illustrated, it is within the contemplation of this invention to utilize other mounting devices that are known in the art.

The rail assemblies 42, 44, 46 and 48 are installed to the adaptor 14 in a specific location. Each of the rail assemblies 42, 44, 46 and 48 are adapted to fit only one location to assure a desired orientation of the rail assemblies 42, 44, 46 and 48 to comply with application specific requirements. Each of the rail assemblies 42, 44, 46 and 48 are identified by a color code. The color of the lug 32 corresponds to a color on the lug mount 30 to provide a determination of the correct position for mounting of the rail assembly.

The color code in the illustrated example is green for the rail assembly 42 and is indicated schematically by shading 17B on the the rail assembly 42 and shading 17A on the lug mount 30. The rail assembly 46 includes a gold color code schematically indicated at 19A on the rail 16 and a matching gold color indicated at 19B on the lug mount 30. The rail assembly 44 includes a silver color code (not shown) and the rail assembly 46 includes a black color code (not shown). The color-codes 17A and 19A disposed on the rail 16 of each rail assembly 42, 46 comprise a colored tape. The color-codes 17B and 19B on the lug mounts 30 are provided by a desired plating color. As appreciated, other colors and method of adhering that color to the lug mount and the rail may be utilized to identify each position on the adaptor 14 with the corresponding one of the rail assemblies 42, 44, 46 and 48. The different color codes provide for easy identification of the proper location for the rail assembly.

Figure 2:
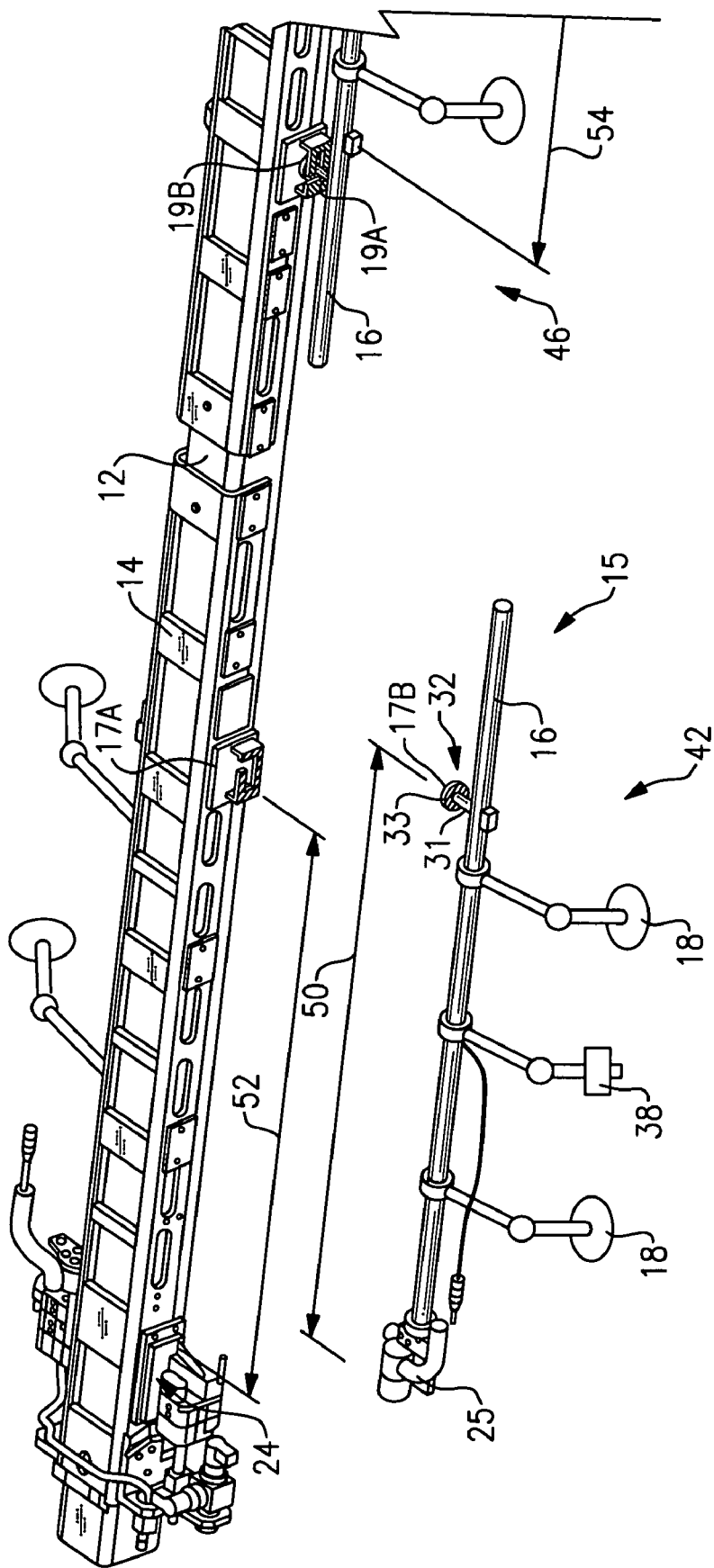
FIG. 2 is another perspective view of the example bar tool mounting system with a rail removed.

Referring to FIG. 2, the rail assembly 42 is illustrated removed from the rail adaptor 14. The rail assembly 42, like the other rail assemblies 44, 46 and 48 includes a length 50 between the lug 32 and a portion of the mount plug 25. The length 50 for each of the rail assemblies is unique such that one rail assembly cannot be assembled into the place of another rail assembly. In the example illustrated in FIG. 2, the rail assembly 46 includes a length 54 that is different than the length 50 such that the rail assembly 46 cannot be assembled in place of the rail assembly 42. The length 50 between the lug 32 and the end of the mount plug 25 corresponds to a length 52 between the mount connector 24 and the lug mount 30. The length 52 is measured from a stop of the mount connector 24 and a position within the horizontal portion 39 of the slot 35 within the lug mount 30.

The length 50 between the lug 32 and the end of the mount plug 25 is a dimension that is fabricated within desired tolerances to provide the desired fit once mounted. As appreciated, some prior art tool mounting devices include multiple critical dimensions that must be closely controlled to provide the desired fit, or event to allow assembly. The instant tool mounting system includes only a single closely held dimension, thereby simplifying assembly, and fabrication.

The rail assembly 42 is easily removable by unlocking the mount plug 25 from the mount connector 24 and moving the entire rail axially away from the mount plug 25 until the lug 32 is free to move vertically within the slot 35 of the lug mount 30. Another rail assembly including tooling for a differently shaped and configured workpiece can then be installed to provide a relatively quick and easy tooling change over.

In operation, several sets of rail assemblies will be provided that correspond to various and differently configured workpieces. Change over is conducted by removing one set of color-coded rail assemblies and installing another set in the proper color coded locations. Rail assemblies can only be properly installed into corresponding locations due to the different lengths 50 and 54 between the mount connector 24 and the lug mount 30.

Referring to FIG. 3, the lug mount 30 is shown without the rail and adaptor for clarity. The lug mount 30 includes the slot 35 having the vertical portion 37 and the horizontal portion 39. The drop down feature provided by the lug 32 being received in the slot 35 facilitates quick assembly of a rail assembly. The lug 32 includes a bushing 33 that supports the tool and prevents twisting during installation. The drop down feature thereby prevents twisting of the rail assembly during assembly, thereby substantially eliminating the need for an assembler to support the rail assembly during the entire assembly process.

Referring to FIG. 4, the lug mount 30 is shown schematically that correspond to mounting arrangements for the rail assembly 42 and the rail assembly 46. The slot 35 includes a width 58 for the lug 32. The lug 32 includes the bushing 33 supported on a shaft 31. The shaft 31 includes a diameter 60 that corresponds with the width 58 that provides for assembly of the lug 32 within the slot 35. The width 58 is tailored to each of the rail assemblies 42, 44, 46 and 48 such that each of the rail assemblies 42, 44, 46 and 48 includes a tailored width 58 unique to that particular rail assembly.

Accordingly, the rail assembly 46 is partially shown with the lug 32 having a shaft 31 of a diameter 64 different than the diameter 60 for the rail assembly 42. The lug mount 30 for the rail assembly 46 includes a width 62 of the slot 35' that prevents another rail assembly, such as for example the rail assembly 42 from being installed within the lug mount 30 instead of the rail assembly 46. Accordingly, the different diameters for each shaft 31 of each of the rail assemblies 42, 44, 46 and 48 substantially prevent assembly of a rail assembly in a non-desired orientation.

Referring to FIG. 5, a cross-section of the transfer system 10 is shown with the adaptor 14 attached to the bar 12. As appreciated, the transfer system 10 operates within a space-restricted environment. In some applications, it is desired to limit or eliminate mounting of devices or objects to the top of the bar 12. Such applications may not allow the mounting of electrical wire harnesses and airlines to the top surface of the bar 12. In such applications, the instant adaptor 14 provides the necessary mounting and communication of air and electric to the tooling without extending substantially beyond the top surface of the bar 12. The addition of the adaptor 14 adds only the minimal thickness of the adaptor 14 to the overall height of the bar 12.

Accordingly, the inventive workpiece transfer system 10 includes several features that assure proper configuration of the several rail assemblies 42, 44, 46 and 48 that expedite and facilitate quick tool changeover. Different lengths between mounting points for each rail assembly and tailored diameters of shafts for each lug accompanied by color-coded parts provides for fail safe and efficient tool change over. Further, the drop down mounting provided by the lug and lug mount tool mount configuration eases mounting by eliminating awkward and difficult maneuvering of the rail assemblies during the mounting process.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A mounting system for mounting tools to a base comprising:
   a moving base;
   a plurality of selectively releasable mounts attachable to the moving base;
   a plurality of lug mounts corresponding to the plurality of releasable mounts, each of said plurality of lug mounts attached to the moving base a distance from a corresponding one of the plurality of releasable mounts; and
   a plurality of rails for mounting tooling, wherein each of the plurality of rails includes a mount plug adapted to be selectively received within the releasable mount and a lug receivable within a corresponding one of the plurality of lug mounts, wherein each of the plurality of rails includes a mating characteristic corresponding with only one of the plurality of releasable mounts and corresponding lug mount.

2. The system as recited in claim 1, wherein the mating characteristic is a distance between the releasable mount and the lug such that only one of the plurality of rails can be assembled in a desired location.

3. The system as recited in claim 2, wherein the lug mount comprises a slot having a vertical segment and a horizontal segment, wherein the lug is received within the vertical segment and slides linearly into the horizontal segment.

4. The system as recited in claim 3, wherein each rail is held in place by the lug disposed within the lug mount substantially independent of the mount plug and releasable mount.

5. The system as recited in claim 3, wherein the distance begins at the mount plug and ends at a desired point within the horizontal slot.

6. The system as recited in claim 3, wherein the lug comprises a flange supported on a shaft adapted to be received within the lug mount.

7. The system as recited in claim 6, wherein the flange is adapted to maintain a radial position of the rail relative to the moving base independent of the mount plug.

8. The system as recited in claim 6, wherein the shaft includes a diameter that corresponds to one of the plurality of lug mounts such that only one of the plurality of rails can be assembled in a desired location.

9. The system as recited in claim 1, wherein the mating characteristic comprises a color of the mount plug and the lug.

10. The system as recited in claim 1, including an adaptor mountable to the moving base, wherein the plurality of selectively releasable mounts and the plurality of lug mounts are attached to the adaptor.

* * * * *

UNITED STATES PATENT AND TRADEMARK OFFICE
CERTIFICATE OF CORRECTION

| | | |
|---|---|---|
| PATENT NO. | : 7,748,107 B2 | Page 1 of 1 |
| APPLICATION NO. | : 11/248074 | |
| DATED | : July 6, 2010 | |
| INVENTOR(S) | : Hurst et al. | |

It is certified that error appears in the above-identified patent and that said Letters Patent is hereby corrected as shown below:

Col. 2, line 30, delete "to selectively" and insert --to a selectively--; and

Col. 3, line 7, delete "on the the rail" and insert --on the rail--.

Signed and Sealed this

Seventeenth Day of August, 2010

David J. Kappos
*Director of the United States Patent and Trademark Office*